United States Patent [19]

Brendel et al.

[11] 4,000,230
[45] Dec. 28, 1976

[54] PROCESS FOR PRODUCING SHEETING HAVING FIBROUS SURFACE

[75] Inventors: Hugo Brendel, Memmingen; Heinz Federau, Amending, both of Germany

[73] Assignee: Metzeler Schaum GmbH, Memmingen, Germany

[22] Filed: Aug. 20, 1974

[21] Appl. No.: 498,928

[30] Foreign Application Priority Data

Aug. 21, 1973 Austria .............................. 7267/73
July 26, 1974 Austria .............................. 6185/74

[52] U.S. Cl. .................................. 264/37; 156/72; 264/85; 264/93; 264/164; 264/167; 264/171; 264/243

[51] Int. Cl.² ........................................ B29C 17/02

[58] Field of Search ........... 264/212, 216, 171, 37, 264/164, 85, 284, 243, 167, 93; 156/72

[56] References Cited

UNITED STATES PATENTS

| 2,345,013 | 3/1944 | Soday | 264/216 |
| 3,179,550 | 4/1965 | Friedman | 264/212 |
| 3,390,403 | 6/1968 | Van Tilburg | 264/284 |
| 3,600,260 | 8/1971 | Watanabe | 264/243 |
| 3,696,183 | 10/1972 | Steel et al. | 264/284 |
| 3,708,565 | 1/1973 | Seiffert | 264/167 |
| 3,809,734 | 5/1974 | Watanabe | 264/243 |
| 3,814,791 | 6/1974 | Jones | 264/164 |
| 3,860,370 | 1/1975 | Fanto-Kuertocs | 264/164 |
| 3,870,778 | 3/1975 | Steel | 264/164 |

FOREIGN PATENTS OR APPLICATIONS

| 2,157,510 | 7/1972 | Germany | 264/164 |
| 2,057,149 | 6/1971 | Germany | 264/164 |

*Primary Examiner*—Jeffery R. Thurlow
*Attorney, Agent, or Firm*—Armstrong, Nikaido & Wegner

[57] ABSTRACT

A process is provided for manufacturing a product which has a fibrous surface and is formed by the conversion of a non-fibrous polymer, which process comprises placing a polymer between drawing surfaces which adjoin the polymer and adhere thereto and separating the surfaces. At least one of the surfaces is formed by a carrier for the polymer and for the fibers, through which carrier a fluid is blown such as to flow around the fibers in statu nascendi and orient and stabilize them as their viscosity increases. An apparatus for carrying out said process is also provided.

12 Claims, 3 Drawing Figures

PROCESS FOR PRODUCING SHEETING HAVING FIBROUS SURFACE

BACKGROUND OF THE INVENTION

Printed German Application No. 1,753,695, U.S. Pat. No. 3,399,425, and British Patent No. 1,072,236 disclose processes and apparatus for manufacturing products which have a tufted surface from non-fibrous polymers. In these known processes at least one thermoplastic layer is pressed to the extent of at least part of its thickness against a heatable surface, which is provided with projections or depressions and the layer is subsequently stripped from the surface. In one of the processes, the surface of the polymer layer which has been shaped by the pressing operation is heated to a moderately elevated temperature as it is stripped.

German Patent Specification No. 1,266,441, corresponding to U.S. Pat. No. 3,708,565 describes another process in which a polymer is brought between two smooth drawing surfaces and in a molten state is torn apart at right angles to its direction of movement and is cooled at the same time so that fibers are formed. In that case the coolant stream acts on the fiber-forming region in a direction which is opposite to the direction of movement of the polymer. In a more recent process, which is a development of the one just outlined and has been disclosed in the Opened German Application No. 2,053,408, the molten polymer is forced through a porous carrier and against a smooth drawing surface, from which the layer is then pulled and simultaneously cooled so that fibers are formed.

Opened German Specification No. 2,157,510 describes a process of manufacturing a product which has a plush surface. That process is characterized in that, inter alia, the polymer is forced with the aid of a carrier against a heatable drawing surface and, as the formation of the fibers begins, is pulled away from said drawing surface with simultaneous cooling and subsequent deflection of the carrier. The coolant stream acts also into the fiber-forming region in a direction which is opposite to the direction of travel of the carrier. Besides, a contact cooling is effected on the rear of the carrier. Processes of this kind have the disadvantage that the fibers which are forming are contacted by the coolant throughout their length at the same time, so that the action of the coolant on fibers behind those which are being formed is highly reduced; this is not altered by the contact cooling on the rear.

A development of that proposal in consideration of its disadvantages has led to a process which is disclosed in Opened German Specification No. 2,057,149, corresponding to U.S. Pat. No. 3,701,621 and in which a flowing coolant acts on the rear of the carrier approximately in the direction of travel of the carrier and flows along and in part through the carrier. In that case the carrier layer is not deflected in the fiber-forming region and fibers which are forming remain subjected to the temperature of the heated drawing surface.

In these known processes, cooling is accomplished by a stream of gas or liquid, which produces a cooling action which is either too slow or too abrupt. In connection with such processes, it is generally stated that the polymer must be completely removed from the drawing surface to avoid interference with subsequent fiber formation.

The recognition of the shortcomings have led to providing means which control the action of the flowing fluid in the very area in which the fibers originate or are in "statu nascendi" and also control of the shape of the fibers throughout the fiber-forming region so that production can be carried out at a high, economical rate and the quality of the product can be uniformly controlled.

SUMMARY OF THE INVENTION

The necessary control of the flowing fluid is accomplished by a process which, according to the invention, is characterized in that the fluid flows through a carrier serving as a drawing surface for the polymer and then enters the fiber-forming region. The carrier is withdrawn and, within the region which is subjected to the action of the flowing fluid, the carrier together with the adhered polymer is deflected from its direction so as to move away from the other drawing surface. By regulating the temperature of the drawing surface with respect to the surroundings, the temperature of the polymer and, also by regulating the input polymer-volume depending from or to the volume of flowing coolant a continuous coating is produced which stays on the drawing surface in a thickness of at least 10 microns. The molten polymer is supplied to the fiber-forming region at a temperature which is above, and preferably considerably above, its melting point; i.e., at a temperature of 10°–200° C above the melting point.

DETAILED DESCRIPTION

It is of significance for the process that, in the region subjected to the action of the flowing fluid, the carrier surface is separated from the heatable drawing surface and is deflected when a spacing between the surfaces of 0.5–40 millimeters, preferably between 0.5 and 10 millimeters, has been established. The distance travelled by the carrier prior to deflection depends on the curvature of the heatable drawing surface. Within the scope of the invention, the distance travelled may amount to between a few millimeters and some centimeters, preferably between 5 and 50 millimeters and up to an upper limit of about 100 millimeters. As a result of the deflection of the carrier, the root portion of the fiber is withdrawn from the intense action of the flowing fluid so that this portion is extended to a smaller thickness and a longitudinal molecular orientation is imparted to the fibers before the tips of the fibers are torn from the heated drawing surface near their upper ends.

It has been found necessary to provide for a proportionality or approximately proportionality between the solidification rate of the polymer and of the fibers' temperature. Thus, if the solidification is too rapid, the molten polymer is torn apart only as coarse fibers so that flakes rather than the desired fibers would be formed from molten material of high viscosity, whereas only thin filaments having bulblike roots could be pulled from molten polycondensates of low viscosity.

For this reason, the process of the invention is applied primarily to polymerization products which have a low molecular weight and, correspondingly, a high melt index.

On the other hand, the use of highly crystalline high polymers, particularly of polycondensates of such polymers, is rendered difficult by the high crystallization rate. It has thus proved desirable to use such high polymers in the form of copolymers or in polyblends together with other polymers so that the tendency to crystallize is reduced and the solidification range is increased. For instance, pure polyoxymethylene (POM) when used alone results in thin and brittle fibers but, in admixture with 10% by weight low density polyethylene, it can be used to produce a useful product having a catskinlike feel or hand. An admixture of polyamides with POM also improves the fiber-forming process. On the other hand, pure Polyamide 6 (PA 6) when used alone results in thin fibers which look like cotton-wool. If this material is copolymerized with Polyamide 66 (PA 66) or with ethylene or is mixed with 12% by weight polymethylmethacrylate of low viscosity, a fabric-like textile plush can be produced. Mixtures of Polyamide 6 (PA 6) with Polyamide 11 (PA 11) or PA 12 or PA 6.10 exhibit a wider solidification range; in these cases, the second component may be added in an amount up to 30% by weight. Other mixtures which have given favorable results comprise saturated polyesters, such as polyethyleneterephthalate or polybutyleneterephthalate, together with Polyamide 6, PA 11, PA 12 or copolyamides. The fiber-forming process and the quality of the product can be improved if such polyblends are additionally cross-lined as they are processed.

The use of pure polypropylene (PP) having an MFI at 190/5 of 20 normally results in a fiber having a thickness of, e.g., 10 microns. The addition of Polyamide 12 results in increasingly thinner fibers until the proportion of PA 12 is so large that a structure like that of cotton-wool is obtained.

Inorganic substances, such as fillers and dyestuffs or additives have a high thermal conductivity, when used in the polymer layer accelerate solidification during the formation of fibers. In most cases, such fibers tear off sooner. In the process according to the invention, the use of such substances in a concentration up to 50% by weight is facilitated by the use of polymers having a low melt viscosity. Polymers which in a molten state have a low viscosity have proved particularly suitable for use in processes according to the invention.

These include, inter alia:
polyethylene having a MFI 190/2 of 10–300 grams/10 minutes;
ethylene/vinyl acetate having a MFI 190/2 above 10 grams/10 minutes;
polypropylene having a MFI 190/5 of 10–70 grams/10 minutes;
polymethylmethacrylate having a MFI 210/10 above 10 grams/10 minutes;
cellulose acetate, cellulose acetate/butyrate, and cellulose propionate CA, CAB, CP having a MFI 190/2 above 8;
polyoxymethylene having a MFI 190/2 above 13 grams/10 minutes;
polyvinyl chloride/acetate having a K value below 50;
hard polyvinylchloride having a K value below 60 and containing at least 15% plasticizer;
polyamide 6 having a relative velocity between 2.1 and 3.4;
polyamide 12 having a relative viscosity between 1.7 and 21.1; and
polyethyleneterephthalate having a relative viscosity above 1.6.

It is apparent from the above data that additional polymerization products are useful in the new process if they have a high melt index, whereas polycondensates such as polyamides and saturated polyesters can be used in commercially available grades.

The following considerations, inter alia, govern the selection of polymers:

A low melt viscosity improves the adhesion so that much more fiber nuclei are formed than in case of a high melt viscosity;

A molten material at a high temperature results in a lower melt viscosity so that the fiber-drawing time is prolonged, and this prolongation provides for a longer time in which measures to control the process can be carried into effect.

It is necessary according to the invention that only a part of the polymer is converted into fibers in the fiber-forming region. In conventional processes it has always been attempted to ensure that the heatable drawing surface is free of residual polymer after the fiber-forming operation is completed because it was feared that the next pass resulting from the continued movement of the heatable drawing surface would otherwise disturb the fiber-forming process. Results obtained using the process according to the invention have proved opposite. The fiber-forming process of the invention is carried out in such a manner that the forces of cohesion in the polymer cause the solidifying fibers to visibly constrict near their point of contact with the heatable drawing surface rather than at said point and to be torn apart clearly at a distance from the drawing surface. Thus, in accordance with the invention a substantially continuous polymer coating produced on the heatable drawing surface in the first fiber-forming process is intentionally maintained in a thickness of at least 10 micron after this first fiber-forming process and additional polymer is coated on the first coating as the movement of the drawing surface is continued. From the endpoints of the torn fibers, which are located within infinitesimal distances from one another, the coating surface structure becomes a mountain and valley-like shape when leaving the fiber forming region. The smallest thickness of the coating is at least 10 microns in the valley portion. During the transport by the heated drawing surface the coating then becomes smoother and smoother due to the surface tension, so that it reaches the point of input of new polymer in even a flat condition. If desired, the additional polymer may be admixed during the formation of fibers with the retained polymer film or layer so that the layer is continually renewed.

The admixing of a new polymer layer of a dissimilar polymer with polymer coating remaining on the drawing surface can be used to transform layers of dissimilar polymers in the fiber-forming process into composite fibers by an action which is the same as that during the formation of the fibers from a single layer. Fibers of polyblends differ from fibers made from a single layer in that the different polymers are laminated rather than finely dispersed therein. This feature permits of a production of fibers having properties which cannot be obtained from a mixture of polymers having different melt viscosities.

Laminated fibers can also be produced, e.g., by a fibrillation of layers of polyvinylchloride and a second polymer. In this case, the process can be controlled so that each fiber contains layers of pure polyvinylchloride which are adjoined, possibly with gradual transitions, by other layers which consist only of the other polymer. Because this lamination results in fibers having specific properties, such a fiber structure can be predetermined in view of the desired fiber properties such that the finished fiber has the combination of properties which are optimally required for a given use.

In connection with certain fiber properties it is significant that, in the region in which the carrier is deflected, the flowing fluid is applied at an angle within the range of +65° to −45°, preferably of +55° to −15°, relative to a normal plane of the heatable drawing surface in the deflecting region. Thus the flowing fluid does not impinge with maximum intensity on the area where the fiber nuclei are formed but must flow through the carrier in that region in which the polymer layer is distorted and transformed into fibers. The flow of the fluid is then diverted at the heatable drawing surface so that the fluid is deflected partly into the region where the fiber nuclei are formed and partly into the fiber-forming region in which the fibers solidify completely. Such action can be controlled by a selection of the direction of flow of the approaching fluid. The form of the fibers is greatly dependent on the intensity of the action of the flowing fluid.

The flowing fluid consists of gases, vapors, sprayed liquids, or of solids entrained by gases and/or vapors, or of mixtures thereof. Mixtures of gases and liquids have proved particularly satisfactory with the process of the invention because they result in a particularly large heat transfer and can take up much heat. The use of gas-liquid mixtures is also preferred because the evaporation of the liquid results in a cooling of the fluid. The use of mixtures of gases and liquids and of a substance which can react with the liquid or gas to extract heat therefrom has also proved desirable and practicable. The chemical substance may be used in solid or liquid form. An action which can be matched with solidification in a simple manner can be obtained by the use of a sprayed liquid at moderately elevated temperatures. Besides, mixtures may be used as coolants in such a manner that at least one component of the mixture is deposited on the fibers.

An important feature of the process of the invention resides in that the carrier is deflected by at least 5° and at most 90° from its direction, preferably, as explained below, in a range of 10°–80°. The degree of deflection of the carrier is chosen mainly in consideration of the nature of the polymer and of the desired quality. Where mainly linear polymers are used, a larger angle of deflection is preferred than with branched polymers. Optimum results are to be expected if, in the processing of polyolefins (other than low density polyethlene), the angles of deflection lie between 30° and 80° whereas in the processing of low density polyethylene they should lie in a range between 10° and 60°. In the processing of saturated linear polyesters, the selected angles lie in the range from 50° to 80°, and in the processing of cellulose acetate, cellulose acetate butyrate the selected range is between 20° and 60°. Polyblends can be processed with good results if the angle of deflection is at least 80°.

If longer fibers are to be produced from the polymers listed hereinabove, angles of deflection near the upper limits stated are preferred.

It has been found desirable to protect unfibrillated polymer, i.e., the coating or polymeric film on the drawing surface from the action of the atmosphere, e.g., by a suitable covering, which may suitably consist of non-oxidizing gases. By using such measures, oxidation which would disturb the process can be inhibited. Whereas these disturbances are not measurably important with respect to the quality of the fibers, they may result in a discontinuity in the application of the polymer to, and the uniformity of contact with, the heatable drawing surface. With some polymers, such as commercially available polyolefins, an antioxidant incorporated in the polymer layer can accomplish this result. In other polymers, primarily polycondensates, the action of such antioxidant is insufficient so that it is necessary to prevent directly access of oxygen. For instance, it has been found to be preferable particularly in the processing of polyoxymethylene, polycarbonates, polyamides, and saturated polyesters to provide a shield or to use a non-oxidizing gas which flows around the polymer layers. In such case, a shield is provided which is spaced about 5–10 millimeters from the heatable drawing surface and parallel thereto and which protects the drawing surface from the environment and also acts as a reflector. Whereas it is known that polyamide can be processed only with difficulty, it can be uniformly fibrillated when this measure is adopted. If the remaining unfibrillated polymer is contacted by flowing non-oxidizing gas, the thermal decomposition of the polymer will be reduced. This is favorable with respect to the strength of the fiber as well as in subsequent processing, such as the dyeing of polyamide and polyester fibers.

The above described process is carried out with suitable apparatus which is characterized in that a nozzle body is desposed adjacent to the fiber-forming region and in contact with the carrier at the point of deflection of the carrier.

The deflection of the carrier in the area of the discharge orifice of the fluid is generally accomplished by the nozzle body and for this purpose that portion of the nozzle body which surrounds the discharge orifice is suitably formed as a comb which is rounded or tapers to a sharp edge and has teeth which are connected or disconnected at their distal ends. The carrier may alternatively be deflected just before or just behind the discharge orifice although the tolerance should possibly not be in excess of 10 millimeters.

Further details and advantages of the process and the design of apparatus for carrying out the process will now be explained with reference to embodiments shown in the accompanying drawings, in which:

Figure 1:
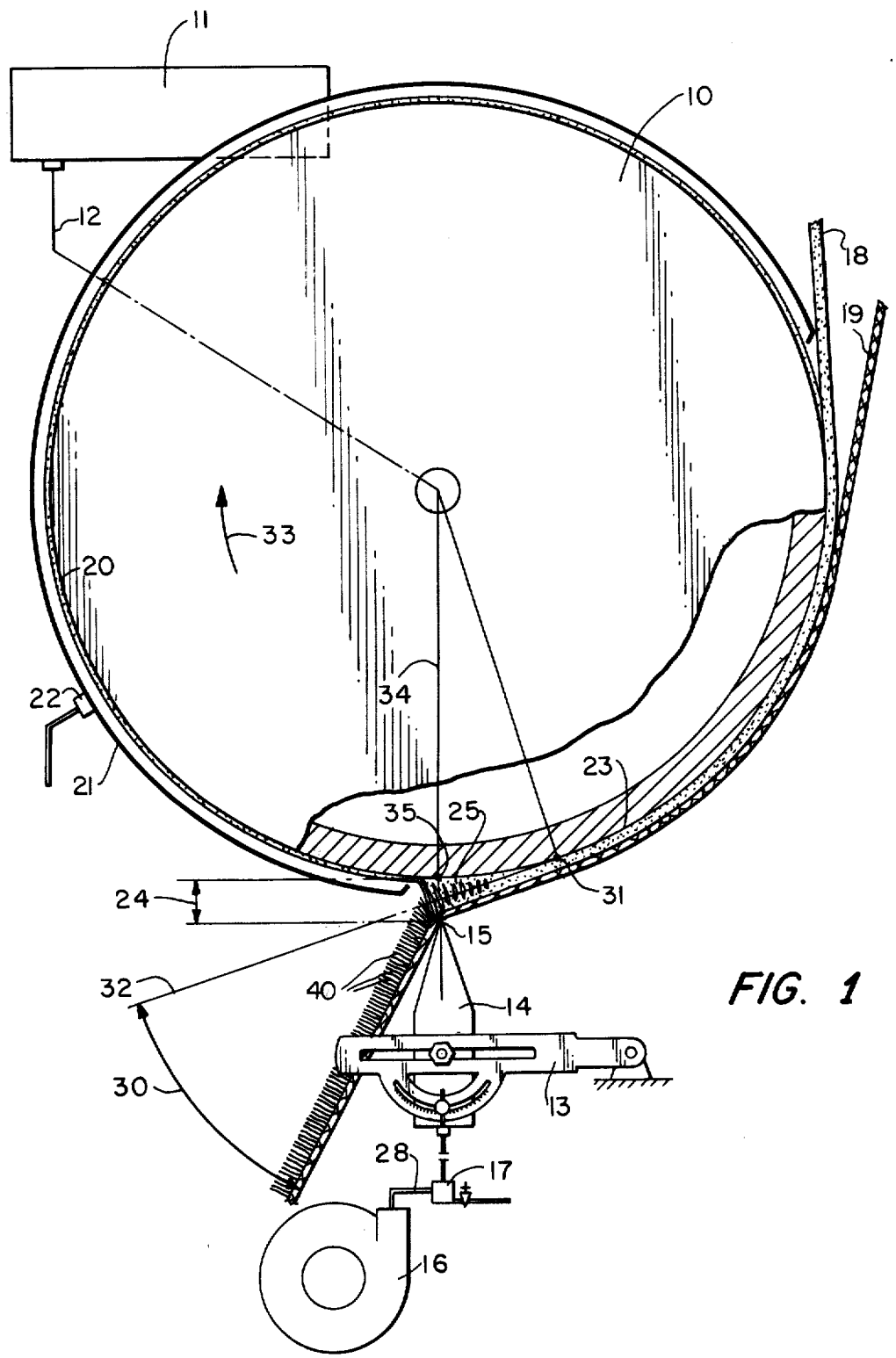
FIG. 1 is a diagrammatic general view showing an apparatus for carrying out the process.

The apparatus shown in FIG. 1 comprises a driven drum 10 which forms one of the drawing surfaces and is heatable by a heater 11 and a conduit 12. A nozzle body 14 is disposed near the surface of the drum 10 and is mounted in a holder 13 to be pivotally movable and adapted to be displaced toward the surface of the drum. The nozzle body has a slotlike discharge orifice 15 which extends throughout the length of the drum and can be arranged to face the drum 10 in all angular positions of the nozzle body. The nozzle body 14 is connected by a conduit to a fluid pressure generator 16. A mixture fitting 17 may be connected, which can be operated by hand or which can be operated automatically to work dependently with process variables.

Feed means (not shown) are provided for applying to the surface of the drum 10 a polymer layer 18 and a carrier web 19 for the polymer. The carrier web wraps the drum 10 in a part of its surface. The apparatus extending across the length of the drum is so designed that after the fiber-forming operation (which will be described more fully hereinafter) a residual polymer film 20 is left on the drum surface and carrier 19 is deflected around the nozzle body 14 by an angle 30. The angle of deflection 30 is measured from a tangential plane 32, which is applied to a generatrix 31 of the drum surface. At generatrix 31, polymer 18 and carrier 19 begin to separate from the cylindrical surface which is formed by the surface of the drum.

That portion of the drum surface, which in the direction of rotation (arrow 33) succeeds the point of deflection and which is disposed between said point and the point where additional polymer 18 is applied, is surrounded by a shield 21. The space between the surface of the drum and shield 21 is filled by a non-oxidizing gas, which is supplied through a fitting 22.

The nozzle body 14 provided with the fluid discharge orifice 15 can be adjusted within a wide range for an unrestricted adaptation to all process variables. It is also apparent that, in the illustrated embodiment, holder 13 is pivotally movable within an angular range of about ±75° relative to an imaginary radial plane 34 which intersects the nozzle discharge orifice and about the line where plane 34 intersects the surface of drum 10. The distance 24 of the discharge orifice 15 from the surface of drum 10 can be adjusted and fixed within a range of 0.5–40 millimeters.

As is apparent from FIG. 1, polymer 18 is applied in a radial plane intermediate the surface of drum 10 and carrier 19 in the direction of movement of the drum 10 as indicated by the arrow 33. Alternatively, the lines of application of the polymer and carrier may lie in one and the same radial plane.

Figure 2:
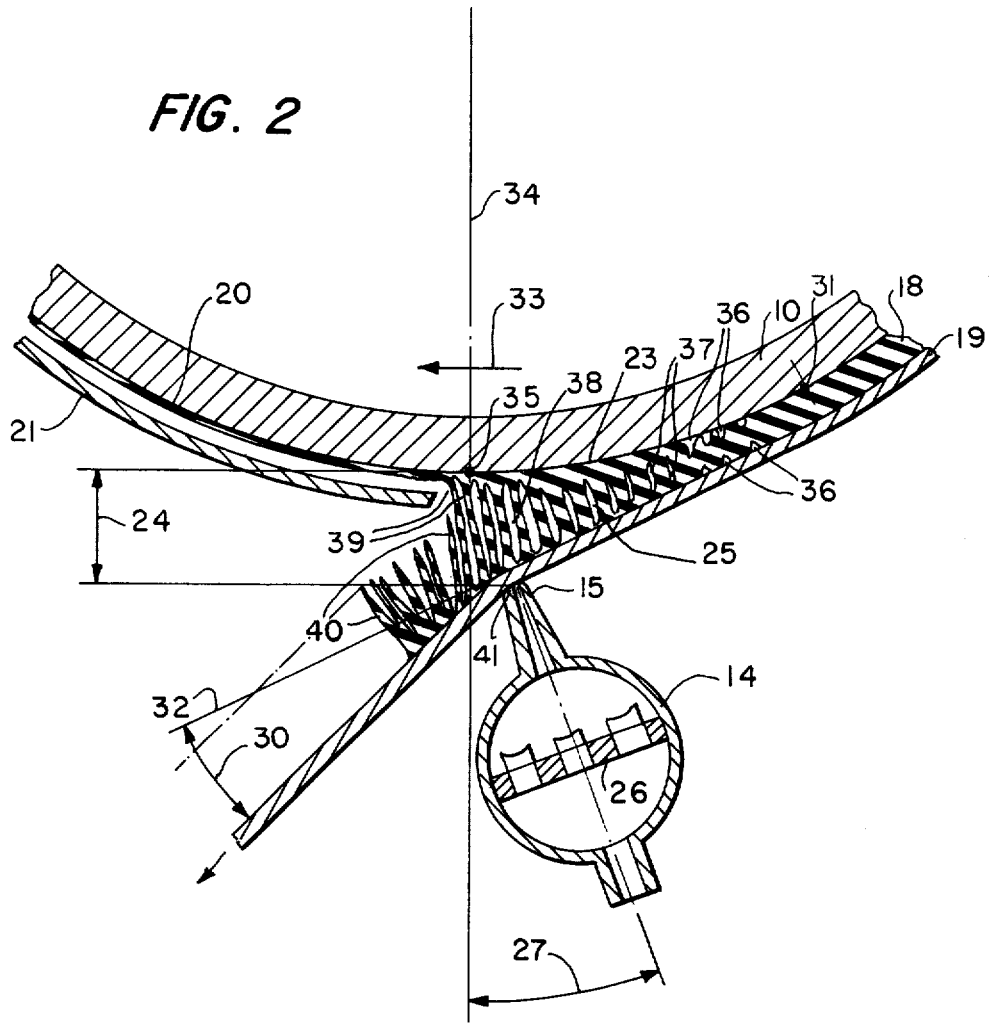
FIG. 2 is an enlarged view showing a detail of FIG. 1.

FIG. 2 is an enlarged view showing a portion of FIG. 1 to illustrate details of the arrangement near the point of deflection. FIG. 2 illustrates how fibers are formed in fiber-forming region 25 which, in the direction of movement of the drum 10, is disposed between the generatrix 31, the fibrillation region and carrier 19. In the embodiment of FIG. 2 the nozzle body 14 is positioned at positive angle 27 with respect to radial plane 34.

At the intersection of the radial plane 34 and the heated drum 10 polymer 18 has been raised to such a temperature that it is 10°–200° above the melting point so that it adheres on one side to carrier 19 and on the other side to drawing surface 23. Because the carrier begins to separate from drawing surface portion 23 of the surface of the drum 10 before reaching plane 34, the film-like molten polymer 18 begins to separate from the drawing surface 23 and adheres on the upper surface of the carrier. This separation proceeds transversely to the tangential plane 32 as the separation of the carrier 19 from the drawing surface 23 increases. The free spaces formed on both sides of the polymer 18 as the result of the separation of webs 36 merge to form cavities 39 as the separation of carrier 19 from drawing surface 23 increases; these cavities are disposed in the interior of the polymer and extend transversely to the plane of the drawing. This action takes place adjacent to orifice slot 15 of nozzle body 14. For this reason, the action of the discharging fluid and the intentional deflection of the nozzle body begin here. The nozzle body comprises a comb which extends at right angles to the plane of the drawing throughout the length of the drum 10. As a result of this incipient action, the webs 36 of polymer between the elongated cavities 37 are progressively attenuated so that constrictions 39 are formed which progressively increase in a peripheral direction to such an extent that the tensile forces which are produced in the polymer as a result of the increasing separation overcome the cohesive forces. As a result, polymer filaments are formed, which are distributed over the length of the drum and are transformed into solidified, stabilized and fibers having a longitudinal orientation. Controlling variables, such as the rate at which the polymer is supplied per unit of time, the circumferential velocity of the drum 10, the drum's surface temperature, the surrounding temperature and the polymer's temperature, pressures and consequently the velocity and volume of flow of the fluid, the input of polymer and the structural dimensions of the apparatus, are adjusted so that the polymer is not completely transformed into fibers but a film 20 of residual polymer is intentionally provided because the maintenance of such film has been found to be essential for and characteristic of the process. Some of these variables are naturally regulated depending to the drum's surface qualities or adhesion qualities therefrom.

As is apparent from the transverse sectional view of the nozzle body 14, the latter contains a flow-dividing grid 26 which insures that the fluid discharged from the orifice slot 15 forms individual streams which are uniformly distributed over the cross-section of the slot. These streams insure uniform fiber-forming conditions throughout the length of the drum 10 particularly because said streams flow at uniform velocities.

In nozzle body 14, the comb may form a sharp edge so that the point of deflection 41 and the discharge orifice of the nozzle are accommodated within a very small space. In other cases, a certain distance between the discharge orifice and the point of deflection may be more desirable. In still other cases, the polymer layer must be deflected on a generatrix of the drum surface before the discharge orifice of the nozzle body 14, when viewed in the direction of rotation of the drum 10.

Figure 3:
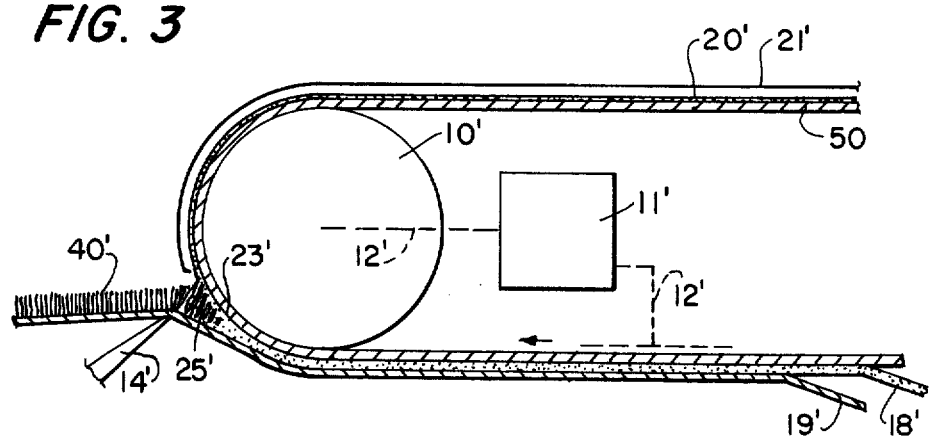
FIG. 3 shows a modification of FIG. 1.

FIG. 3 shows an apparatus which is provided with a heatable belt 50, which is trained around the drum 10' and forms the drawing surface 23' for the polymer 18' and the carrier 19'. The carrier 19' is again deflected in the fiber-forming region 25' about a nozzle body 14'. This embodiment has the advantage of requiring less space.

The fiber-forming process is inevitably accompanied by flow processes by which the film produced on the surface of the drum 10 and consisting of polymer which has not been used to form fibers receives a coating of additional polymer or additional polymers. Because the polymer layers are molten, they mix but without a dispersion such as would result from the mixing of the polymer by a stirrer. A laminated mixture results and is subjected to the process of the invention so that laminated fibers are formed which have a longitudinal orientation.

The drawing surfaces must be designed so as to ensure a good adhesion of the polymer to the drawing surface. For the sake of economy, drawing surfaces are provided which consist of portions of preferably cylindrical bodies because such bodies can be made at very low cost by lathe operations. This concept has been adopted in the embodiments explained hereinbefore. All surface-finishing processes which are known in the art may be used unless they result in surfaces to which the polymer cannot adhere or can only poorly adhere.

The drawing surfaces may be chromium-plated, polished, or lapped, for instance. The same criteria are applicable to belts such as are shown in FIG. 3 of the drawing. Drawing surfaces consist suitably of metallic surfaces although the invention is not restricted thereto. Metallic drawing surfaces can easily be machined and provide for a particularly good and uniform conduction of heat.

All techniques known in the art may be adopted to heat surfaces which are used according to the invention. Heat may be supplied by conduction, conversion or radiation.

As regards the design of the nozzle body, it has already been pointed out that it should suitably be capable of a pivotal, rotational or translational movement so that it can be moved to a position which is an optimum in view of specific requirements. The drag which is due to the carrier and the fiber-forming region may be used to deflect at least part of the flowing fluid so that it flows opposite to the direction of movement of the carrier and if desired, substantially parallel to the carrier. For this purpose, the nozzle body may be provided with bevelled or rounded surfaces (reference numeral 41).

Besides, numerous ways are known in fluid dynamics to control a fluid so that it can perform the functions which are required. As stated above the fluid may generally consist of gases or vapors, or of liquid or solid particles entrained by a flowing fluid and such liquid and/or solid particles may be added to the fluid before it enters the nozzle body. A simple measure comprises the spraying of water into flowing air. In this case, the points of supply may be disposed before or in the discharge orifice of the nozzle body or between the latter and the carrier and/or polymer. Such points of supply may be disposed at different locations. Where the fluid consists of a gas, an inert gas is preferred and may consist mainly of nitrogen and carbon dioxide.

The state of the fluid is of significance and may be adjusted in any known manner by pressure, temperature, ionization and/or other electric or electrostatic or electrodynamic or magnetic and electromagnetic charges and other variables which control state to ensure the desired behavior. Certain limits must be taken into account which define the ranges in which the required intermediate values and such limits will mainly depend on the required fiber properties. For instance, if the action exerted by the fluid to promote the formation of fibers is insufficient, the formation of fibers will also be insufficient and the production will lack economy. On the other hand, if the intensity of the action is increased beyond a certain limit, the molten polymer will solidify too rapidly and the formation of fibers will be insufficient for this reason. It has also been found that the molecular orientation of the fibers will depend on the angle of deflection and on the distance of the deflecting means from the drawing surface. As these are empirical values, the accompanying table gives a synopsis of the order of magnitude of the values in question so that an interpolation may be used to indicate (also for polyblends) the values which will result in fibers having predetermined properties.

TABLE

Part A

| No. | Polymer Type | Amount g/m$^2$ | Carrier Type | Amount g/m$^2$ | Drum temp. °C | Orifice mm | Nozzle angle deg. |
|---|---|---|---|---|---|---|---|
| 1 | PVCA[3] K = 50 | 80 | PU[1] foam 30 kg/m$^3$ | 60 | 205 | & 4 | 4 |
| 2 | PVCA[3] K = 50 | 80 | VSF[2] woven fabric 20/13 | 60 | 205 | 2.5 | 6 |
| 3 | PP[4] MFI = 60 | 60 | PU[1] foam 30 kg/m$^3$ | 60 | 190 | 4 | 10 |
| 4 | " | 100 | " | " | " | 12 | 7 |
| 5 | " | 90 | VSF[2] woven fabric 20/13 | 60 | " | 3 | 10 |
| 6 | LD-PE[5] MFI = 20 | 90 | " | " | 205 | 1.7 | 5 |
| 7 | " | 300 | " | " | 205 | 15 | 10 |
| 8 | PMMA[6] MFI = 12 | 90 | " | " | 235 | 3 | 12 |
| 9 | POM[7] | 100 | " | " | 195 | 2.5 | 10 |
| 10 | PA 6[8] rel. visc = 2.8 | 90 | " | " | 245 | 2 | 4 |
| 11 | PA 6[8] + 15% PMMA[6] | 90 | " | " | 245 | 2 | 4 |
| 12 | Mixture 50% LD-PE[5] 50% talcum | 90 | " | " | 205 | 1.7 | 5 |
| 13 | 1st layer PVCA[3] 2nd layer | 70 50 | " | " | 205 | 2 | 10 |

TABLE-continued

LD-PE[5]

[1]PU = polyurethane
[2]VSF = viscose staple fiber
[3]PCVA = polyvinyl chloride/acetate
[4]PP = polypropylene
[5]LD-PE = low density polyethyle
[6]PMMA = polymethylmethacrylate
[7]POM = polyoxymethylene
[8]PA = polyamide

Part B

| No. | Angle of deflection deg. | Air pressure mm water | Velocity of carrier m/min | Length of Fibers mm |
|---|---|---|---|---|
| 1 | 40 | 300 | & 1.5 | 10 |
| 2 | 40 | 600 | 1.8 | 11 |
| 3 | 60 | 700 | 3 | 12 |
| 4 | 70 | 450 | 3 | 45 |
| 5 | 60 | 700 | 4 | 12 |
| 6 | 40 | 1,500 | 5 | 3 |
| 7 | 70 | 1,500 | 2 | 30 |
| 8 | 50 | 1,300 | 4 | 12 |
| 9 | 50 | 1,200 | 3.5 | 12 |
| 10 | 70 | 700 | 6 | 12 |
| 11 | 70 | 700 | 6 | 12 |
| 12 | 40 | 1,500 | 5 | 4 |
| 13 | 60 | 1,200 | 4 | 7 |

We claim:

1. In a process of manufacturing a product comprising a carrier web and a fibrous surface formed from a non-fibrous polymer, which process comprises supplying a polymer having a melt viscosity such that it is capable of being drawn into fibers when molten to a zone intermediate the carrier web and a heatable drawing surface, heating the polymer to render it molten, separating the carrier web and the drawing surface to provide a fiber-forming region in which fibers are formed from the molten polymer and adhere to the surface of the carrier web, and introducing a fluid into the fiber-forming region, which fluid serves to stabilize the fibers as their viscosity increases, the improvement comprising:
   a. forming a molten polymer layer between the carrier web and the drawing surface by heating the polymer at a temperature of at least the melting point of the polymer;
   b. separating the carrier web from the drawing surface to create a fiber forming region immediately adjacent to the point of separation in which a portion of the molten polymer is formed into fibers adhering to the carrier web and the remaining portion of the polymer adheres to and is retained on the drawing surface as a substantially continuous film with a thickness of at least 10 microns,
   c. introducing the fluid at a point contiguous to the carrier web and on the reverse side of said web directly opposite to the fiber forming region, whereby the fluid is directed through the web into the fiber-forming region, causing said fluid to flow around the fibers in statu nacendi and to orient the fibers, and
   d. deflecting the carrier web having fibers formed thereon by an angle of 5°-90° in a direction away from the drawing surface and in the area in which the fluid is directed through the carrier web.

2. A process according to claim 1 wherein the carrier web is deflected after it travels a distance of 0.5-40 mm away from the point of separation from the heatable drawing surface.

3. A process according to claim 2 wherein said distance is 0.5 to 10 mm.

4. A process according to claim 1 wherein the polymer is heated to a temperature of 10° to 200° C above its melting point.

5. A process according to claim 1 wherein the polymer is polyethylene.

6. A process according to claim 1 wherein the polymer is polypropylene.

7. A process according to claim 1 wherein the polymer is polyvinyl chloride.

8. A process according to claim 1 wherein the polymer is polyamide.

9. A process according to claim 1 wherein the fluid is introduced at angle in the range of +65° to −45° relative to a normal plane passing through the drawing surface at the point of deflection.

10. A process according to claim 1 wherein the carrier is deflected by an angle of 10°-80°.

11. A process according to claim 1 wherein unfibrillated polymer is protected from contact with the atmosphere.

12. A process according to claim 11 wherein the unfibrillated polymer is protected by the action of a non-oxidizing gas.

* * * * *